United States Patent [19]

Wisse et al.

[11] 3,801,179

[45] Apr. 2, 1974

[54] NARROW BAND-PASS ULTRAVIOLET OPTICAL FILTER SYSTEM

[75] Inventors: Jan Hendrik Wisse; Willem Lodewijk Van Es, both of Amsterdam, Netherlands

[73] Assignee: Beckman Instruments, Inc., Fullerton, Calif.

[22] Filed: Jan. 2, 1968

[21] Appl. No.: 695,286

[52] U.S. Cl................. 350/1, 252/300, 350/312
[51] Int. Cl............................ G02b 5/24, F21v 9/06
[58] Field of Search......... 252/300; 350/160 P, 312, 350/316, 1

[56] References Cited
UNITED STATES PATENTS
3,008,858  11/1961  Blake et al........................ 161/199

*Primary Examiner*—Richard D. Lovering
*Attorney, Agent, or Firm*—Robert J. Steinmeyer

[57] ABSTRACT

A narrow band-pass ultraviolet filter for continuous determination of protein consisting essentially of a first component (e.g., a concentrated solution of nickel sulfate and cobalt sulfate or red-purple "Corex" A glass) for absorbing substantially, or otherwise eliminating from consideration, all incident light in the visible region of the spectrum and a part of the light in the ultraviolet region of the spectrum, a second component (e.g., a concentrated solution of a heavy metal salt plus an acid addition salt of 2,7-dimethyl-3,6-diazacyclo-1,6-heptadiene) which is a filter component for absorbing a substantial part of the light in the near ultraviolet region of the spectrum, and a separate third component for absorbing light of wavelengths below 260 millimicrons and a greater part of the light above 340 millimicrons, the separate third component consisting essentially of a complex compound of one or more metals (viz., Cr, Mn, Fe, Co, Ni, Cu or rare earth) and one or more chelating agents selected from the group consisting of ethylenediaminotetra-acetic acid, iminodiacetic acid, nitrilotriacetic acid, diamines, and condensation products of diamines and carbonyl compounds. Components in solution form are enclosed in cells, the walls of which are transparent to ultraviolet light.

8 Claims, No Drawings

NARROW BAND-PASS ULTRAVIOLET OPTICAL FILTER SYSTEM

This application is a continuation of Ser. No. 360,750, filed Apr. 17, 1964, now abandoned.

This invention relates to optical filter systems, more particularly filter systems which transmit only a narrow band of wavelengths in the ultraviolet region.

For several purposes, for example, for the analysis of proteins, it is desirable to have available monochromatic light in the ultraviolet region of the spectrum. As regards light having a wavelength in the region of 260 to 300 millimicrons, one generally has to use mercury lamps which, however, not only emit light in this region but also light of several other wavelengths. It is necessary to eliminate these other wavelengths since they would reduce the accuracy of any analysis. To this end, one can have recourse either to a monochromator or to a filter. However, monochromators are bulky and expensive apparatus, while the commercially available filters in actual practice are unsatisfactory.

In J. Opt. Soc. Am. 38, 929–934 (1948) and 51, 895–897 (1961), filter systems have been described consisting of solutions and/or crystals of heavy metal salts and of an acid addition salt of 2,7-dimethyl-3,6-diazacyclo-1,6-heptadiene, if desired in conjunction with a glass filter. The filters from the last mentioned of these publications transmit light in a relatively broad band of wavelengths and accordingly do not enter into consideration for the present purposes. The filters disclosed in the first mentioned publication possess the same disadvantage, however, to a lesser extent. They have, however, a long optical path, and require the use of a volatile organic liquid.

It is an object of the present invention to provide an optical filter system of the above described type which avoids those disadvantages and drawbacks, and with which one can obtain a region of transmitted wavelengths having a half-width of no more than 14 millimicrons at a total optical path of at most 4 cm.

The filter system of the present invention is characterized by the fact that it contains, either in solid form or in the form of a solution, a complex of one or more of the metals, chromium, manganese, iron, cobalt, nickel, copper and the rare earths with one or more chelating agents.

Like the known ones, the filter systems of this invention consist of a number of components, each of which transmits only certain parts of the spectrum, so that the entire combination as much as possible only transmits light of the desired wavelength. To this end, one uses in the first place a component which absorbs the greater part of the visible light and a part of the light in the far ultraviolet region. As such a component, one can use, e.g., a concentrated solution of nickel sulphate and cobalt sulphate, or a commercially available glass, such as red purple "Corex" A glass. It should be remarked here that wherever according to this invention one uses a solution, one can apply this solution in a known way in a cell or other suitable container having walls which transmit ultraviolet light (e.g., quartz walls), in which the solution is shut off from the air.

A further part of the visible light and a considerable part of the light in the near ultraviolet is eliminated by the second component. As second component, one can use crystals or a concentrated solution of a heavy metal salt in conjunction with an acid addition salt of the 2,7-dimethyl-3,6-diazacyclo-1,6-heptadiene. This last mentioned compound is also known as "Cation X" and this name will be used hereinafter for the sake of brevity. As heavy metal salt, one can use, for instance, nickel sulphate or cobalt sulphate. If the heavy metal salt is used in the form of a solution, this solution can also contain the salt of Cation X dissolved therein, but the latter compound may also be incorporated into a film of suitable material (e.g., a high polymer) and used in this way as a separate component, or it can be contained in a separate solution. The nature of the anions of all these salts is not critical; however, when the use of solutions is desired, one should choose salts which per se or in combination possess sufficient solubilities. As salt of Cation X the commercially available perchlorate can be used conveniently.

The use of filter components such as described hereinabove is known in the art. According to the invention, it is now possible to obtain a simple and efficient filter system by using the known components in combination with one or more further components comprising a complex compound of one or more of the metals chromium, manganese, iron, cobalt, nickel, copper and rare earths with one or more chelating agents.

Examples of suitable chelating agents are ethylenediaminotetra-acetic acid (EDTA), iminodiacetic acid, nitrilotriacetic acid, diamines, and condensation products of diamines and carbonyl compounds. According to this invention, the complex compound can be used in a solid form or in the form of a (preferably concentrated) solution.

Of course, one will choose the components of the filter in such a way that they have maximum stability. However, this is not an absolute necessity, since if only a limited series of measurements is desired, one could also work with solutions which are only stable during a relatively short time (e.g., a few days).

By making an appropriate choice of the several components of the filter, the range of transmitted wavelengths can be adjusted to any value between 260 and 300 millimicrons, while also the width of the transmitted band can be controlled. In this respect, it should be remarked that evidently there is a relation between the bandwidth and the intensity of the transmitted light, the intensity increasing with the width of the band. Accordingly, one will always strive for an optimum combination of band-width and intensity, and this optimum can vary from case to case.

The invention is further elucidated by the following examples which, however, are not intended to limit the invention in any respect.

EXAMPLE I

The first component consists of a mixture of a solution of 550 g/l of $CoSO_4 \cdot 7H_2O$ and a solution of 600 g/l of $NiSO_4 \cdot 6H_2O$, the volume ratio of these two solutions being 1:1. This component absorbs the light between about 370 and 550 millimicrons, and furthermore all the visible light having wavelengths of over 650 millimicrons.

The second component consists of a mixture of solutions of 550 g/l of $CoSO_4 \cdot 7H_2O$ and 2.5 g/l of perchlorate of cation X in the volume ratio 10:0.6. This component absorbs a part of the light transmitted by the first component, i.e., the band between about 300 and 340 millimicrons and also a part of the remaining visible light.

The third component consists of a solution obtained by adding 20 g/l of the dihydrate of disodium to a solution of 600 g/l of NiSO$_4$·6H$_2$O ethylenediaminetetraacetate and adjusting the pH of this mixture to a valve of 6.5–6.8 with the aid of ammonia (25 percent). This component absorbs the light having wavelengths below 260 millimicrons and furthermore the greater part of the light of wavelengths above 340 millimicrons which is still transmitted by the combination of the other two components.

The three solutions are each enclosed in cells transparent to the ultraviolet light. The thickness of the layers traversed by the light is 1 cm. for each of the three solutions.

EXAMPLE II

The first component consists of red purple "Corex" A glass (CS7-54; thickness 3 mm). This glass transmits light in a large region of wavelengths in the ultraviolet part of the spectrum, and also red light which, however, is eliminated by the components mentioned hereinafter.

The second component consists of a cell containing a mixture of solutions of 600 g/l NiSO$_4$·6H$_2$O and 2.5 g/l of perchlorate of cation X in a volume ratio of 10:0.6. The cell has an optical path of 1 cm. This component eliminates the rest of the visible light, and furthermore the light having wavelengths over 300 millimicrons with the exception of a small region at about 350 millimicrons where a slight transmission occurs.

The third component consists of a cell containing the same solution as used as the third component in example I. The optical path of this cell is also 1 cm.

EXAMPLE III

The first component consists of the same glass as in example II. The second component consists of a cell having an optical path of 1 cm., and containing a mixture of the same solutions as in the second component of example II, but this time in the volume ratio 10:0.9.

The third component consists of a solution obtained by adding 30 g/l of the dihydrate of disodium ethylenediamine-tetraacetate to a solution of 600 g/l of NiSO$_4$·6H$_2$O, and adjusting the pH of the mixture with ammonia (25 percent) to a value of 6.5–6.8. The optical path of this cell is 1 cm.

The half-width of the transmission band is considerably smaller in this case than in example II. Of course, this implies less transmission in the desired region, but this transmission is still ample for most purposes.

The filter systems disclosed in the above examples possess the following transmission characteristics for the light of a mercury lamp of the Hg/3 (HgS) type:

| Filter system of Example | Maximum transmittance (%) | Wave length maximum transmittance (m$\mu$) | Half-width (m$\mu$) | Amount of light in visible and near ultraviolet region (% of total transmittance) |
|---|---|---|---|---|
| I | 13.5 | 277 | 14 | 0.7 |
| II | 12 | 277 | 14 | 0.2 |
| III | 8 | 277 | 12 | 0.1 |

We claim:

1. An optical filter system for transmitting only a narrow band of wavelengths in the region of approximately 260 to 300 millimicrons consisting essentially of a first component for absorbing substantially all incident light in the visible region of the spectrum and a part of the light in the ultraviolet region of the spectrum, a second component for absorbing a substantial part of the light in the near ultraviolet region of the spectrum, and a separate, third component including an amount of a light filtering agent for absorbing light of a wavelength below 260 millimicrons and a greater part of the light of a wavelength above 340 millimicrons, said agent consisting essentially of a complex compound of one or more metals selected from the group consisting of chromium, manganese, iron, cobalt, nickel, copper and rare earths, and one or more chelating agents selected from the group consisting of ethylene-diaminotetraacetic acid, iminodiacetic acid, nitrilotriacetic acid, diamines, and condensation products of diamines and carbonyl compounds.

2. An optical filter as in claim 1 in which said second component includes a light filtering agent comprising a heavy metal salt and an acid addition salt of 2, 7 dimethyl-3,6-diazacyclo-1,6-heptadiene.

3. An optical filter as in claim 2 in which said first component comprises a light filtering agent selected from the group consisting of:
   a concentrated solution of cobalt sulfate and nickel sulphate, and
   a visible and far ultraviolet light absorbing glass.

4. An optical filter as in claim 1 in which said first filtering component comprises a light filtering agent selected from the group consisting of:
   a concentrated solution of cobalt sulfate and nickel sulphate, and
   a visible and far ultraviolet light absorbing glass.

5. A multicomponent filter having a maximum transmittance at a wavelength from 260 to 280 millimicrons, a half-width no greater than 14 millimicrons and no more than 0.7 percent of total transmittance in the visible and near ultraviolet consisting essentially of:
   a first filter component for absorbing substantially all incident light in the visible region of the spectrum and a part of the light in the ultraviolet region of the spectrum, said first component including a light filtering agent selected from the group consisting of:
   a concentrated solution of cobalt sulfate and nickel sulphate, and
   a visible and far ultraviolet light absorbing glass;
   a second filter component for absorbing a substantial part of the light in the near ultraviolet region of the spectrum, said second component including a light filtering agent comprising a heavy metal salt and an acid addition salt of 2,7 dimethyl-3,6-diazocyclo-1, 6-heptadiene;
   a third component for absorbing incident light having wavelengths below 260 millimicrons and the greater part of the light of wavelengths above 340 millimicrons, said third component including a light filtering agent consisting essentially of chelate complex of at least one of the metals, chromium, manganese, iron, cobalt, nickel, copper or a rare earth metal; and a chelating agent selected from the group consisting of ethylene-diaminotetraacetic acid, iminodiacetic acid, nitrilotriacetic acid, diamines and condensation products of diamines and carbonyl compounds; and
   cell means composed of walls transparent to ultraviolet light for enclosing each component solution.

6. A filter according to claim 5 in which the chelate complex is nickel-ethylene-diaminotetraacetate.

7. An optical filter as in claim 5 wherein said chelate complex is in solution.

8. An optical filter as in claim 5 wherein said chelate complex is in solid form.

* * * * *